Figure 3:
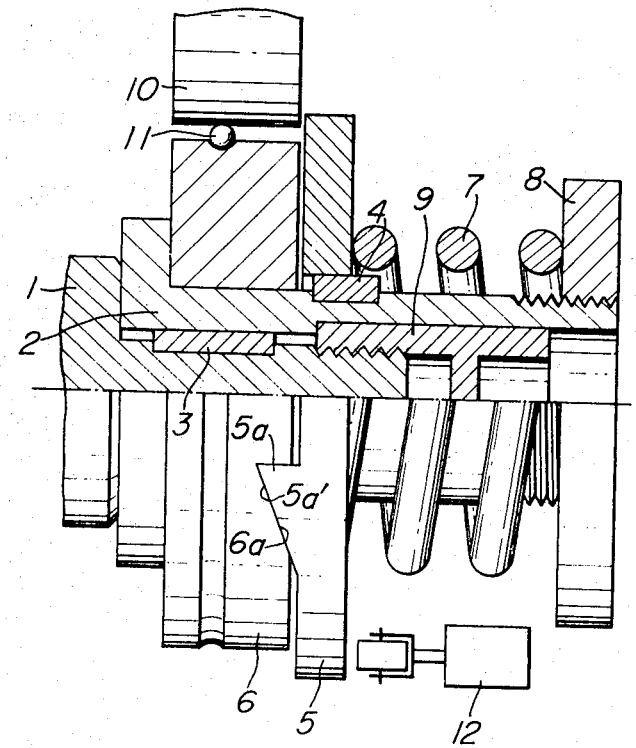

United States Patent
Kobayashi et al.

[15] 3,644,701
[45] Feb. 22, 1972

[54] CONSUMABLE ELECTRODE FEEDING DEVICE FOR ARC WELDERS

[72] Inventors: Makoto Kobayashi, Nishinomiya; Haruo Miyahara, Toyonaka, both of Japan

[73] Assignee: Matsushita Electric Industrial Co., Ltd., Osaka, Japan

[22] Filed: May 19, 1970

[21] Appl. No.: 38,843

[30] Foreign Application Priority Data

May 26, 1969 Japan..................................44/42362
June 6, 1969 Japan..................................44/45976

[52] U.S. Cl..................................219/130, 226/25, 226/37, 64/30
[51] Int. Cl..................................B65h 17/20
[58] Field of Search..................226/188, 25; 64/28, 29, 30; 192/56; 219/130

[56] References Cited

UNITED STATES PATENTS

| | | | |
|---|---|---|---|
| 3,293,477 | 12/1966 | Lobosco | 226/188 |
| 3,103,004 | 9/1963 | Murray | 64/28 UX |
| 2,291,407 | 7/1942 | Paul | 64/29 |
| 2,561,136 | 7/1951 | Richardson | 64/29 |

Primary Examiner—Allen N. Knowles
Attorney—Stevens, Davis, Miller & Mosher

[57] ABSTRACT

A friction clutch is provided to mechanically engage or disengage a feed roller for feeding a consumable electrode and a torque-transmitting means for transmitting the torque of a feed roller driving motor to said feed roller therethrough, with or from each other. The friction clutch is normally being held in an engaged position but is brought into a disengaged position when the travel resistance to said consumable electrode has increased and reached a predetermined value, whereby feeding of the electrode is stopped and buckling of the electrode is prevented.

2 Claims, 3 Drawing Figures

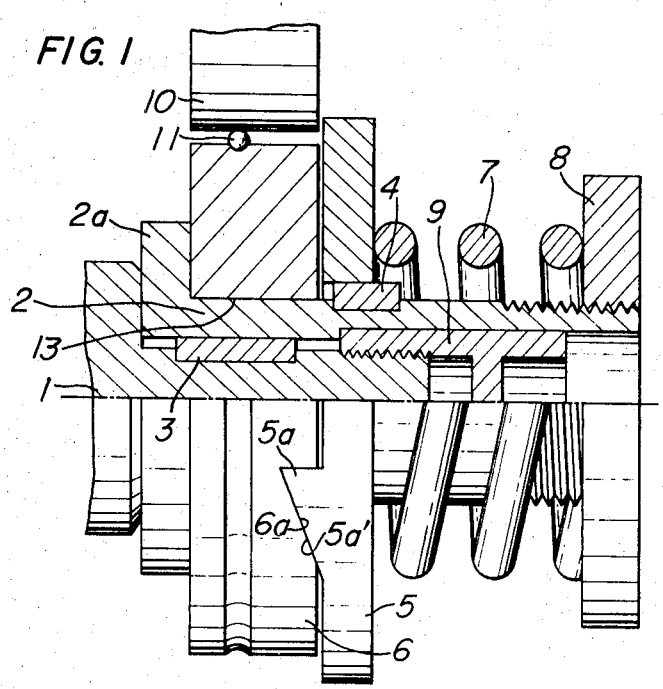
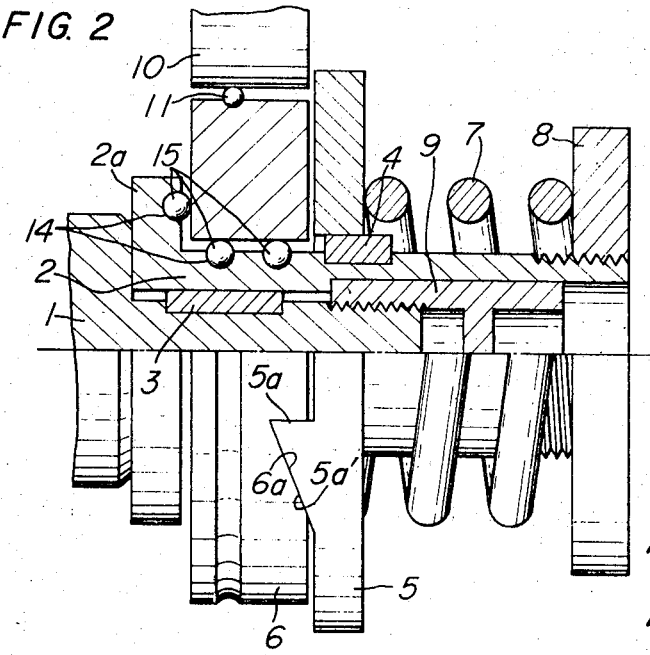

CONSUMABLE ELECTRODE FEEDING DEVICE FOR ARC WELDERS

The present invention relates to a device for feeding a consumable electrode (hereinafter referred to as wire) to a torch of an arc welder utilizing such wire.

In feeding a wire from a wire reel to a torch through a flexible conduit, it is customary to force the wire through the flexible conduit from the wire reel side, instead of drawing the same from the torch side. In this method, the wire tends to be buckled near a feed roller and satisfactory feeding of wire is not always obtained. Such tendency is more apparent when the wire is soft and small in diameter. The buckling of the wire occurs when the travel resistance to the wire caused by the torch tip or the flexible conduit becomes large, and once the buckling has occurred, the welding operation must be interrupted.

For feeding a wire to the torch from a wire reel through a flexible conduit, it has been practiced to provide feed rollers at two locations, i.e., a location adjacent the inlet end of the flexible conduit and a location adjacent the outlet end of said flexible conduit, and to make the feeding speeds of both feed rollers equal by a special electric control means or a special motor so as to avoid slackening and buckling or breakage of the wire between said two feed rollers. However, such a conventional method necessitates the provision of two wire driving mechanisms and, therefore, renders the device complicated mechanically or electrically. It also makes the maintenance and control of the device cumbersome and provides a high percentage of troubles. Further, in the conventional method, the wire drawing motor must be provided within the welding torch, so that the torch becomes substantially large in both size and weight, which not only increases the fatigue of the operator but also restricts the scope of application of the welder.

The above disadvantages may be eliminated by providing the feed roller only on that side of the conduit which is closer to the wire reel. In this case, however, buckling of the wire is inevitable unless the feeding of the wire is stopped at the moment when the sum of the resistance caused by the tip of the welding torch and the resistance caused by the sharp bend of the conduit has reached a predetermined value. In addition, the occurrence of wire buckling is mostly unexpected by the operator. Once the buckling of wire has occurred, a substantially long time is wasted for restoring the normal condition.

In order to avoid the buckling of wire as stated above, it is necessary to stop the wire feeding at the point when the resistance to the wire during its passage from the feed roller to the arc portion has increased and reached a predetermined value, and to simultaneously disconnect the welder from the power source.

The conventional arc welders of the type wherein the wire is fed by force only from the wire reel side, are predominantly designed such that the flexible conduit is disposed straightly so as to minimize the resistance to the wire and thereby to avoid buckling of the wire, and not provided with means for preventing buckling of wire. In some of the prior art arc welders, a mechanism is employed which is capable of stopping the feeding of wire at the point when the resistance to the wire has increased and reached a certain value. However, none of such arc welders are provided with means to interrupt the power supply, concurrently with the stopping of wire feeding. Therefore, when the feeding of the wire has been stopped, the arc flame flares up around the current-conducting tip, resulting in fusion of the wire to said tip. Therefore, while the buckling of wire may be prevented, a damage to the tip by burning is inevitable, which again requires a long time for repair and lowers the operation efficiency.

The first object of the present invention is to provide a wire-feeding device for use in an arc welder of the type utilizing a consumable electrode, which is so designed as to stop the feeding of wire immediately when the resistance to the wire during travel from the wire feed roller to the tip of the welding torch has increased and reached a predetermined value.

The second object of the invention is to provide a wire-feeding device of the character described above, which is so designed as to interrupt the supply of welding current concurrently when it stops the feeding of wire.

According to the present invention there is provided a wire-feeding device for use in an arc welder utilizing a consumable electrode, which comprises a motor, a wire feed roller, a torque-transmitting means for transmitting the torque of said motor to said wire feed roller and a friction clutch for mechanically engaging said torque-transmitting means and said wire feed roller with each other at the contact portions thereof, said friction clutch being normally held in an engaged position but being brought into a disengaged position when the travel resistance to the wire has reached a predetermined value, whereby the wire feed roller stops feeding the wire and thus buckling of the wire can be prevented.

The first advantage of the present invention is that buckling of the wire can substantially be precluded by a relatively simple mechanism, which enables the loss of time to be eliminated which would otherwise be inevitable due to interruption of the welding operation necessitated by the occurrence of wire buckling, the wasteful consumption of labor for the mending of buckling to be eliminated, the working load of the operator to be alleviated, the continuous operation possible, and consequently enables the efficiency of the welding operation to be enhanced.

The second advantage of the present invention is that fusion of the wire to the current-conducting tip and hence a damage to the tip by burning can be prevented which are caused by the arc flame flaring up around the tip upon stoppage of wire feeding, and, therefore, it is possible to avoid the loss of time due to interruption of the welding operation necessitated as a result of fusion of the wire, to avoid the wasteful consumption of labor for the mending of wire fusion, to eliminate the loss of tip due to burning, to reduce a welding cost, to make a continuous operation possible and consequently to enhance the efficiency of the welding operation.

Such advantages of the invention as set forth above is particularly remarkable when the device is used for feeding a wire which is relatively soft and small in diameter. Further, the use of the present device facilitates the application of the method wherein the wire is fed by force only from the wire reel side.

Embodiments of the invention will now be described by way of example, with reference to the accompanying drawings, in which:

FIGS. 1, 2 and 3 are vertical cross-sectional views of embodiments of the wire-feeding device according to the present invention respectively, with the upper half portion shown in section.

In the drawings, similar parts are indicated by same reference numerals.

Referring first to FIG. 1, a sleeve 2 having a flange 2a is fitted on the output shaft 1 of a motor. The torque of the motor is transmitted to the sleeve 2 through a key 3. The rotation of the sleeve 2 is further transmitted to a disc 5 through another key 4 which is fitted in said sleeve. The disc 5 is formed with projections 5a at least at two locations. A feed roller 6 which is fitted on the sleeve 2 for feeding a wire 11, is provided with a groove 6a of a shape complementary to the projections 5a of the disc 5, at a location corresponding to said projections 5a for interlocking engagement with said projections. Each of the projections 5a has an inclined surface 5a. A spring 7 is disposed between the disc 5 and a stopper ring 8 to urge said disc 5 in the axial direction, so that the projections 5a of the disc 5 are pressed into the grooves 6a of the feed roller 6, under the biasing force of said spring 7, to produce a frictional force acting at the contact surface thereof. Namely, a friction clutch is formed by the projections 5a and the grooves 6a. The torque transmitted from the output shaft 1 of the motor to the disc 5 is transmitted to the feed roller 6 through the friction clutch. In this case the torque transmitted from the disc 5 to the feed roller 6, can be adjusted by adjusting the frictional force produced at the contacting surface of the projections 5a of said disc and the grooves 6a of said feed roller, upon adjusting the biasing force of the spring 7. Reference numeral 9 designates a detent screw-threaded on the forward end of the output shaft 1 of the motor to keep the sleeve 2 in position. Reference numeral 10 designates a press roller which presses the wire 11 against the feed roller 6. Reference numeral 12 designates a microswitch (FIG. 3) to detect the disengaged position of the friction clutch.

Now, the operation of the device constructed as described above will be explained. The wire 11 is fed vertically of the sheet of FIG. 1 on the near side by the feed roller 6, while being pressed against said feed roller by the press roller 10. In this case, a torque sufficient to enable the feed roller 6 to feed the wire 11 by producing a force overcoming the travel resistance to the wire over the distance from said feed roller 6 to the outlet of the tip at the end extremity of the torch, is imparted to said feed roller 6 by adjusting the biasing force of the spring 7. If the resistance caused by the tip and the resistance caused by the bent of the conduit increase under such condition, the overall travel resistance to the wire increase relative to that in normal condition and a force corresponding to the increased resistance will act on the wire to push back said wire toward the feed roller 6, so that the wire will be compressed longitudinally from both sides and thus buckling of the wire will result. Such condition will occur easily particularly when the wire is soft or small in diameter. The buckling of the wire can be avoided by removing the feeding force from the wire just before such condition will occur. When the travel resistance to the wire or, in other words, the force to stop the movement of the wire increases and such force becomes greater than the force applied to the feed roller 6 through the projections 5a of the disc 5, the feed roller 6 stops rotating and the disc 5 only keeps rotating. Therefore, the projections 5a of the disc 5 start to slide on the inclined surface of the groove 6a in the feed roller 6 and the torque transmitted to the disc 5 is no longer transmitted to the feed roller 6. In such condition, the output shaft 1 of the motor, the sleeve 2, the disc 5, the spring 7 and the stopper ring 8 rotate integrally and the wire 11 is held stationary. Thus, the buckling of wire can be prevented. On the other hand, the press roller 10 is still pressing the wire 11 against the feed roller 6 by exerting a radial force on said wire, so that the friction acting at the contacting surface of the feed roller 6 and the sleeve 2 is increased. The disc 5 is urged in the axial direction and the projections 5a thereof are in pressure contact with the feed roller 6, under the biasing force of the spring 7, so that the projections 5a apply a force to the feed roller to rotate it. Therefore, it is preferable to select the material of the sleeve 2 so as to reduce to minimum the friction acting at the contacting surface of said sleeve 2 and the feed roller 6, and to finish said contacting surface smooth. For the same purpose, balls 15 may be disposed in slots 14 formed in the sleeve 2 as shown in FIG. 2 or a thrust bearing and a radial bearing may be disposed in said slots, instead of said balls 15. The travel resistance to the wire, which will stop the feed roller 6, may optionally be selected by suitably adjusting the pressure applied to the disc 5 by the spring 7 and the stopper ring 8. Namely, it is possible to select the travel resistance to the wire in accordance with the property of the wire material, i.e., whether the wire is susceptible to buckling or not.

When the friction clutch is released and the wire 11 stops, the disc 5 is urged axially to the right as viewed in FIG. 3. Therefore, if an arrangement is made such that a microswitch 12 is actuated mechanically, by making use of such motion of the disc 5, to disconnect the arc welder from the power source, it will be possible to interrupt the current supply to the arc welder concurrently with the stoppage of feeding of the wire and thereby to prevent fusion of the wire to the tip. Alternatively, it may be possible to convert the operation of the microswitch 12 into an electric signal and break the current supply circuit by making use of the electric signal.

What is claimed is:

1. A wire-feeding device for use in an arc welder utilizing a consumable electrode, which comprises a motor, a wire feed roller, a torque-transmitting means for transmitting the torque of said motor to said wire feed roller and a friction clutch for mechanically engaging said torque-transmitting means and said wire feed roller with each other at the contact portions thereof, said friction clutch being normally held in an engaged position but being brought into a disengaged position when the travel resistance to the wire has reached a predetermined value, whereby the wire feed roller stops feeding the wire and buckling of the wire is prevented, said wire-feeding device additionally comprises a bearing provided between said wire feed roller and said torque-transmitting means where said wire feed roller is pressed against said torque-transmitting means when said friction clutch is in a disengaged position and said wire feed roller is being held stationary, thereby minimizing the friction acting at the contacting surface of said wire feed roller and said torque-transmitting means.

2. A wire-feeding device as defined in claim 1, wherein a microswitch is provided adjacent said friction clutch, so that said microswitch may be actuated by the motion of said torque-transmitting means incident to disengagement of said friction clutch, to disconnect the arc welder from a power source.

* * * * *